(12) United States Patent
Stoppek et al.

(10) Patent No.: US 6,293,185 B1
(45) Date of Patent: Sep. 25, 2001

(54) PISTON FOR A HYDROSTATIC CYLINDER BLOCK

(75) Inventors: Robert J. Stoppek, Ames, IA (US); Mark A. Landwehr, Cicero, IN (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/514,094

(22) Filed: Feb. 28, 2000

(51) Int. Cl.$^7$ ............................... F16J 1/00; F01B 31/08
(52) U.S. Cl. .................. 92/260; 92/172; 92/176
(58) Field of Search ................ 92/255, 256, 257, 92/258, 172, 181 R, 182, 187, 157, 188, 189, 176, 260

(56) References Cited

U.S. PATENT DOCUMENTS

| | | | |
|---|---|---|---|
| 2,730,960 | * 1/1956 | Krause | 92/171.1 |
| 2,880,042 | * 3/1959 | Budzich | 92/258 X |
| 2,980,077 | * 4/1961 | Magill | 92/255 X |
| 3,187,644 | 6/1965 | Ricketts . | |
| 3,319,575 | * 5/1967 | Havens | 92/255 X |
| 3,365,979 | * 1/1968 | Ericson | 92/255 X |
| 3,707,113 | 12/1972 | Hein et al. . | |
| 3,741,077 | 6/1973 | Hulsebus et al. . | |
| 3,783,749 | * 1/1974 | Cunningham et al. | 92/249 |
| 3,896,707 | 7/1975 | Holmstrom . | |
| 3,915,074 | 10/1975 | Bristow et al. . | |
| 3,930,437 | * 1/1976 | Guntert | 92/255 X |
| 3,984,904 | 10/1976 | Schlecht . | |
| 3,986,439 | 10/1976 | Ring . | |
| 3,999,468 | 12/1976 | Bristow et al. . | |
| 4,191,095 | * 3/1980 | Heyl | 92/172 X |
| 4,216,704 | * 8/1980 | Heyl | 92/181 R X |
| 4,478,130 | * 10/1984 | Brenner et al. | 91/499 X |
| 4,494,448 | 1/1985 | Eystratov . | |
| 4,519,300 | 5/1985 | Adomis, Jr. et al. . | |
| 5,007,332 | 4/1991 | Wagenseil . | |
| 5,072,655 | 12/1991 | Adler . | |
| 5,076,148 | * 12/1991 | Adler | 92/172 X |
| 5,216,943 | 6/1993 | Adler et al. . | |
| 5,469,776 | * 11/1995 | Martensen et al. | 92/248 X |
| 5,490,446 | 2/1996 | Engel | 92/157 |
| 5,642,654 | * 7/1997 | Parekh et al. | 92/260 |

* cited by examiner

Primary Examiner—John E. Ryznic
(74) Attorney, Agent, or Firm—Zarley, McKee, Thomte, Voorhees & Sease

(57) ABSTRACT

A piston for use in the cylinder block of a hydraulic power unit. The piston has an elongated cylindrical body and one end terminating in a spherical surface. The piston is composed of a body and insert which are made from different materials, preferably metallic materials, and joined together. The piston body takes the form of a solid cylinder or a hollow cylindrical tube. The spherical surface takes the form of an internal spherical socket or an external spherical ball. The insert takes an elongated or abbreviated form providing for both open cavity and closed cavity piston configurations. The piston includes a conduit which traverses the body and insert, providing a path for pressurized fluid.

19 Claims, 6 Drawing Sheets

PISTON FOR A HYDROSTATIC CYLINDER BLOCK

BACKGROUND OF THE INVENTION

This invention relates to hydraulic power units of the type which incorporate a cylinder block containing reciprocating pistons which, through pivotally attached slippers, are in operational engagement with a swashplate. Such hydraulic power units may operate as either pumps or motors. Specifically this invention is concerned with an improved piston for use in such hydraulic power units.

Typically, the pistons that are utilized in hydraulic power units of the aforementioned type have been manufactured from a metallic material, usually steel, which is heat treated. The particular material and heat treatment process utilized are selected to provide adequate structural strength and wear properties necessary for appropriate piston function and life. Closed end hollow pistons are shown in U.S. Pat. No. 3,319,575. Fluid conduits extending the length of the piston are shown in both the U.S. Pat. No. 3,319,575 and also in U.S. Pat. No. 3,882,762.

Because the piston interacts dynamically with both the cylinder block and the slipper-to-swashplate connection which present different loading and wear challenges to the piston, it has been determined that the material property requirements of the piston are not necessarily uniform throughout the entire structure of the piston. For this reason, it is advantageous to provide a piston which is made up of more than a single material so that various structural elements of the piston may possess different strength and wear properties in its final form.

Generally, it has been determined that the cylindrical body of the piston which is in reciprocating contact with the bore of the cylinder block requires strength and surface wear properties necessitating the use of hardened medium carbon steel. The end of the piston which is connected to a slipper through a spherical joint is subject to compressive rotary and pivotal motion and does not require the extreme strength and wear properties of the cylindrical body. The spherical end of the piston can provide satisfactory function and life when formed of low carbon steel which is not hardened. Additionally, it is often advantageous for the spherical end of the piston to remain malleable to crimping of the end to retain the slipper to the piston in an assembled condition.

Therefore, it is a principal objective of this invention to provide a piston which is comprised of more than a single material.

Further, it is an objective of this invention to form a piston from multiple parts, each part being of a different metallic material.

It is also an objective of this invention to produce a piston which includes a hardened cylindrical body and a malleable spherical end.

It is a further objective of this invention to provide a piston which incorporates a conduit traversing the body and the insert as a path to communicate pressurized fluid from the cylinder bore to the slipper and swashplate operative connection.

Additionally, it is an objective of this invention to assemble the piston to a slipper for subsequent reciprocal operation in the bore of a cylinder block and operative connection with a swashplate in a hydraulic power unit.

These and other objectives will be apparent to those skilled in the art.

SUMMARY OF THE INVENTION

A piston for a cylinder block of a hydraulic power unit has a cylindrical body and one end terminating in a spherical surface. The cylindrical body may take the form of either a solid cylinder or hollow cylindrical tube. The spherical surface may take the form of either an internal cavity or an external ball, and is integral to an insert which is made as a separate piece from the cylindrical body. The body and insert are joined together to produce a complete piston.

The body, either in its solid or hollow form is made from a medium or high carbon steel material. The material is suitable for hardening to provide high structural strength and surface wear properties. The cylindrical body is formed to include an internal seat at one end to accommodate the positioning and attachment of the insert.

The insert, either in its internal or external spherical form is made of low carbon steel material. The material is capable of being subjected to heat treatment operations and still remain malleable. The insert is in the form of a simple cap which can be joined to one end of the body. The insert may also alternatively be formed in an elongated shape which incorporates a circular disc extended from the spherical surface end by an adjoining tubular neck structure. This elongated insert is used in conjunction with the hollow body to form a piston with a closed internal cavity.

In all cases, the final piston incorporates a conduit which passes through the body and the insert. This passage is used to provide a path for pressurized fluid to flow from the pressurized cylinder bore in the cylinder block through the piston and the slipper to the operative connection with the swashplate.

DESCRIPTION OF THE PREFERRED EMBODIMENT

Figure 1:
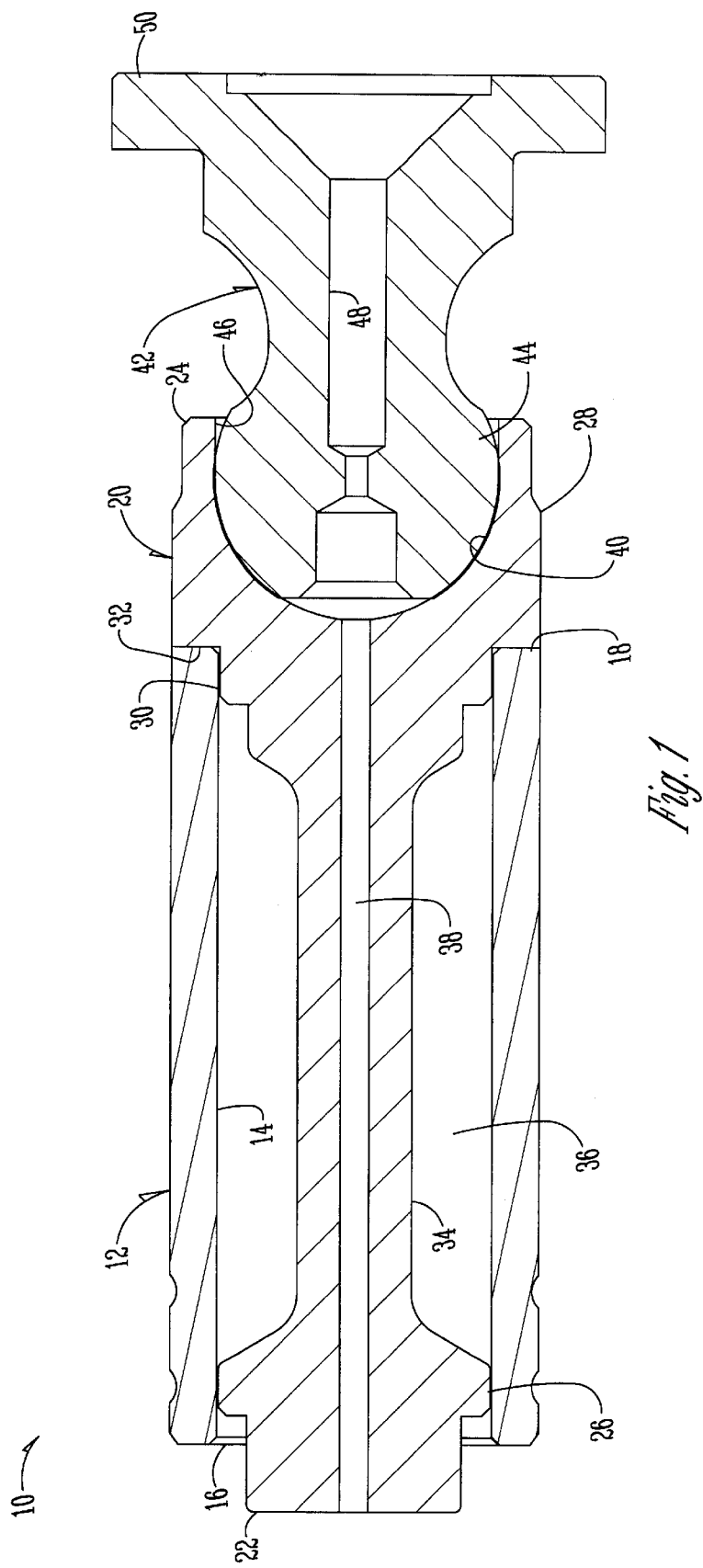
FIG. 1 is a longitudinal sectional view of the piston showing the hollow body, elongated insert with internal spherical socket end, and external spherical ball slipper.

With reference to FIGS. 1–6, corresponding elements have been identified with like numerals and/or sequential letter designations to facilitate understanding of the various invention embodiments that have been contemplated. The numeral 10 designates a piston which has a cylindrical body or sleeve 12 and a center bore 14. Sleeve 12 has a base end 16 and a head end 18. (FIG. 1).

An insert 20 is mounted within center bore 14 and has a base end 22 and a head end 24. An annular hub 26 is formed on the insert adjacent base end 22. Similarly, a head 28 is located on the head end 24. An annular groove 30 is formed in the head adjacent a vertical circular shoulder 32. A center or stem portion 34 with reduced diameter extends between the base end 22 and the head end 24. The reduced diameter center portion 34 creates an empty cavity 36 therearound in relation to the inner diameter of the center bore 14. An elongated conduit 38 extends along the center axis of the insert and terminates in a spherical socket 40 located in head 28.

As also shown in FIG. 1, a slipper 42 has a ball 44 which is rotatably received within socket 40. A thin edge 46 exists between the end 24 of insert 20 and the ball 44 and is adapted to be crimped inwardly towards the exterior surface of the ball to prevent the slipper from being longitudinally removed from the socket 40. The ball 44 is nevertheless rotatably mounted within the socket 40. A center elongated conduit 48 of any desired configuration extends from the inner end of conduit 38 longitudinally through a slipper 42, and terminates in a flat bearing surface 50 which is adapted to engage a conventional swashplate of a hydrostatic pump or motor.

The body 12 is preferably made from medium to high carbon metallic material (AISI 4140, for example). Insert 20 is made from low carbon metallic material (AISI 1010, for example).

Insert 20 is joined to the body 12 at hub 22. The insert is also secured to the body 12 at shoulder 32 adjacent head end 18. Brazing is used as the process to join and seal the body 12 with the insert 20. The piston 10 is subject to further heat treatment in a manner such that the body 12 is hardened and the insert 20 remains malleable. The brazing and hardening may be accomplished in a single heat cycle operation for simplified and economical manufacture.

Subsequently, piston 10 is assembled to slipper 42 such that external spherical ball 44 is seated within internal spherical socket 40, as described above. The edge 46 is thereupon crimped upon the ball 44 as described above. The resulting connection between piston 10 and slipper 42 allows rotary and pivotal freedom of motion between the two parts while preventing them from separating.

DESCRIPTION OF ALTERNATE EMBODIMENTS

It is further contemplated that the body and insert may be manufactured in slightly different shapes which will continue to embody the primary unique and advantageous features previously enumerated.

Figure 2:
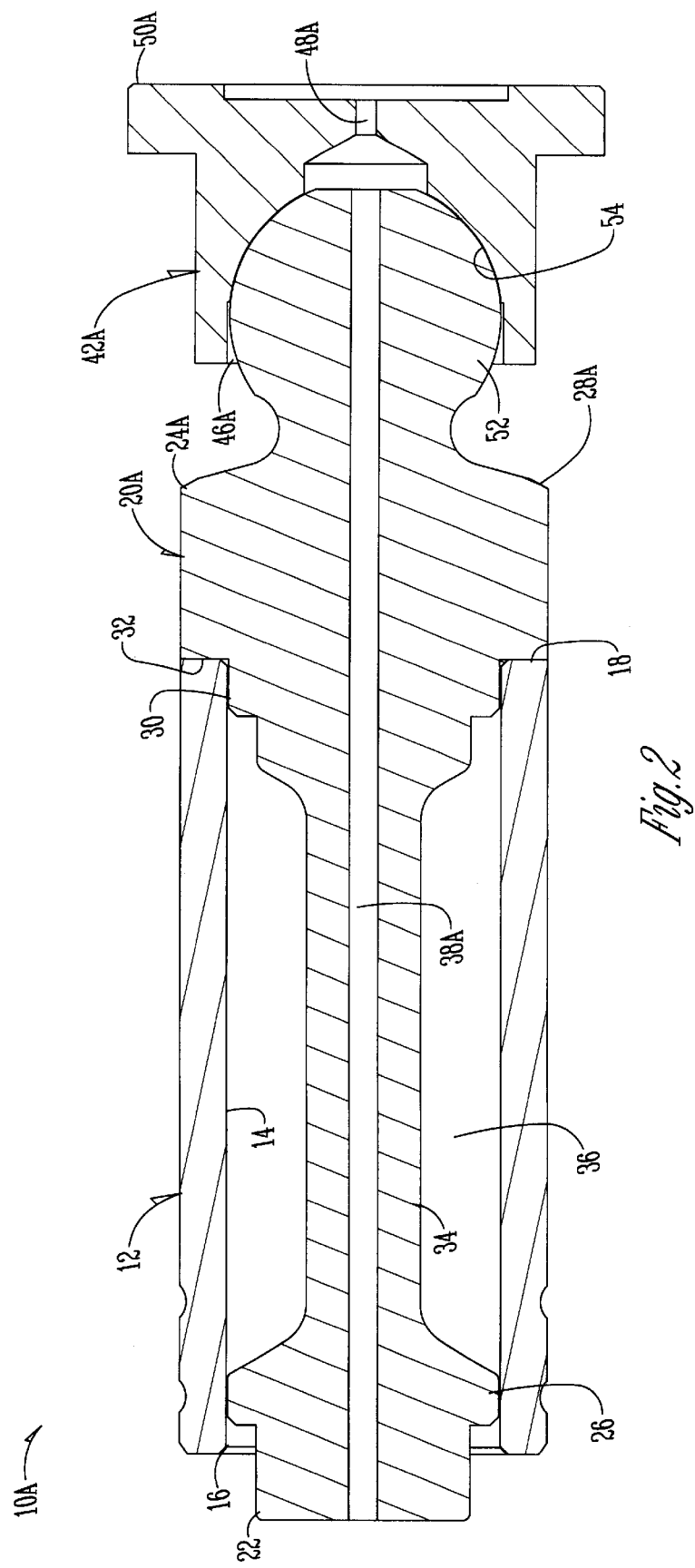
FIG. 2 is a longitudinal sectional view of an alternate piston showing the hollow body, elongated insert with external spherical ball end, and internal spherical socket slipper.

FIG. 2 illustrates an alternative piston 10A wherein the spherical surface formations on the piston and slipper are transposed. In this alternative design, insert 20A terminates in ball 52 which is received in socket 54 of slipper 42A. Again, assembly entails seating ball 52 within socket 54 and crimping edge 46A, as described in regard to the structure of FIG. 1. The remainder of the components as depicted I FIG. 2 are essentially identical to the above described components of FIG. 1. Conduit 38A extends through insert 20A and ball 52 to communicate with conduit 48A in slipper 42A.

Figure 3:
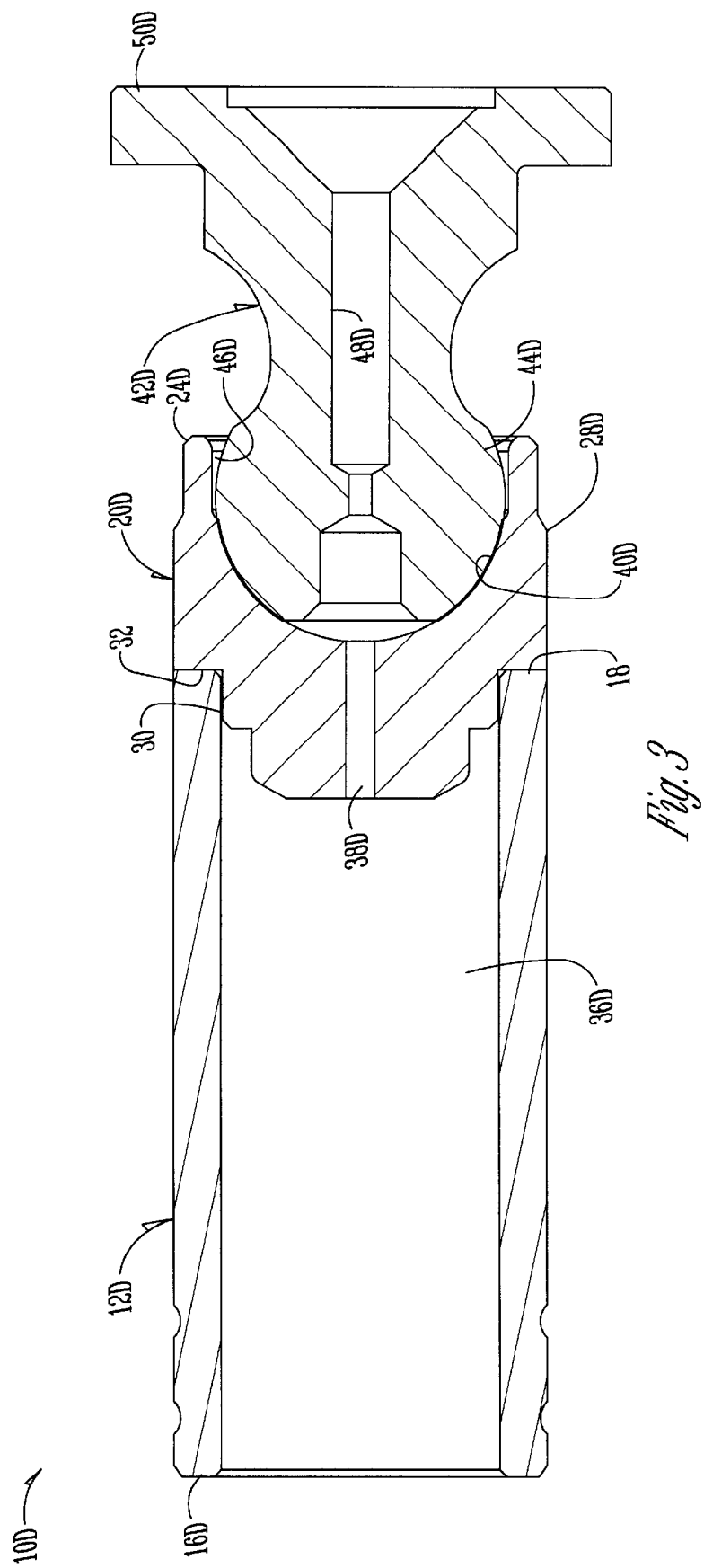
FIG. 3 is a longitudinal sectional view of a third alternate piston showing the hollow body, insert with internal spherical socket end, and external spherical ball slipper.
Figure 4:
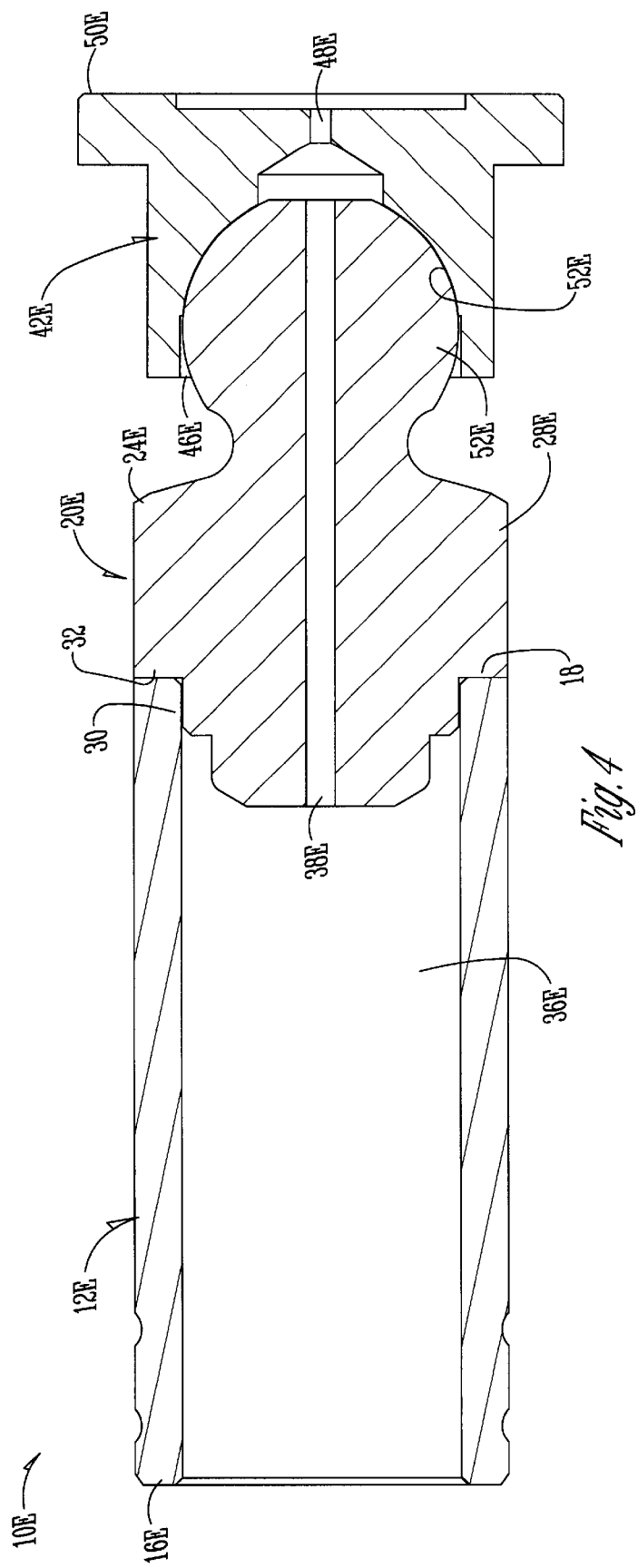
FIG. 4 is a longitudinal sectional view of a fourth alternate piston showing the hollow body, insert with external spherical ball end, and internal spherical socket slipper.

FIG. 3 and FIG. 4 illustrate another pair of piston configurations, 10D and 10E, respectively. In those alternatives, the bodies 12D and 12E are in the form of hollow cylinders with internal cavities. It can be clearly understood that all of the aforementioned features and characteristics are applicable to these variations as well. While different metals for body 12 and insert 20 are preferred, this invention is not limited thereto. The open cavity hollow pistons 10E and 10D of FIGS. 3 and 4 offer the advantage of reduced weight for certain hydraulic power unit applications.

Figure 5:
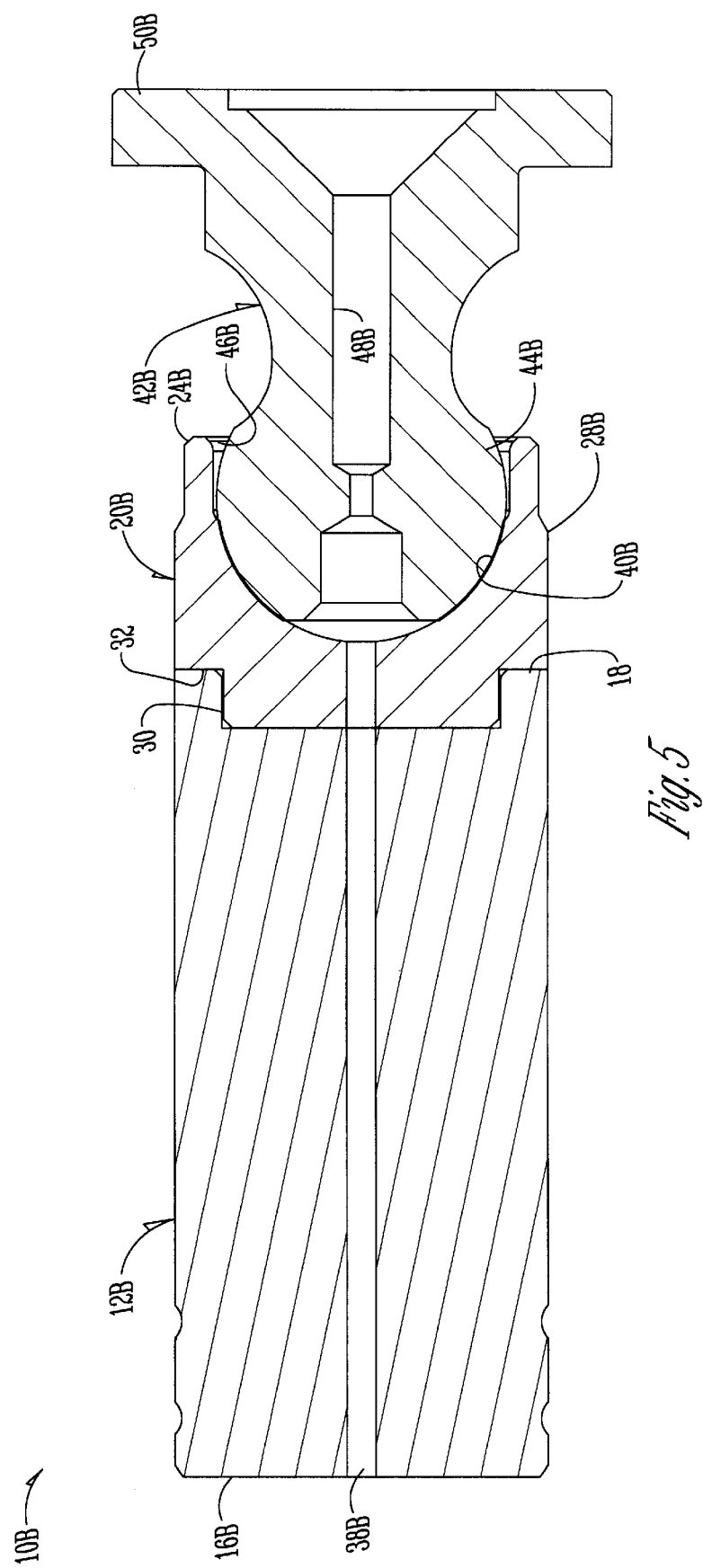
FIG. 5 is a longitudinal sectional view of a fifth alternate piston showing the solid body, insert with internal spherical socket end, and external spherical ball slipper.
Figure 6:
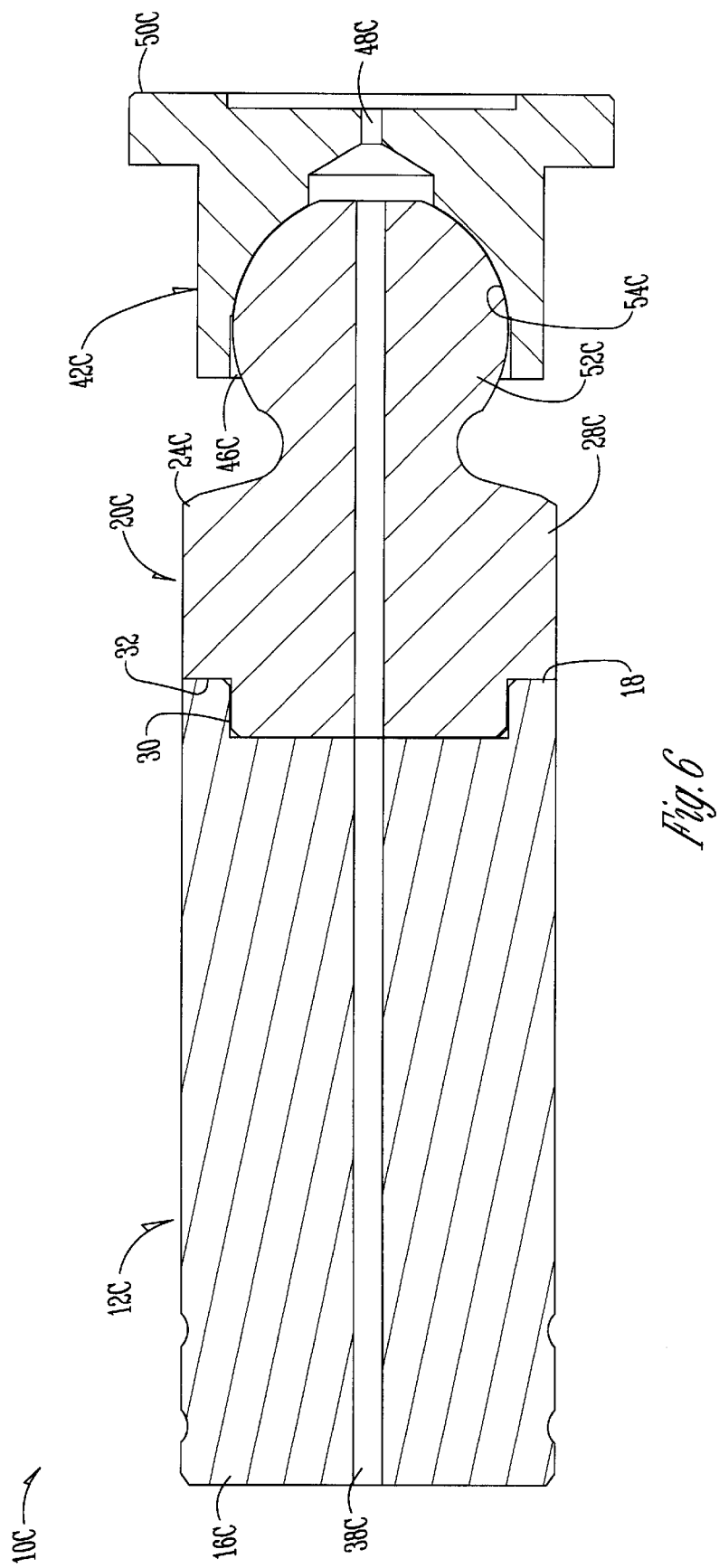
FIG. 6 is a longitudinal sectional view of a sixth alternate piston showing the solid body, insert with external spherical ball end, and internal spherical socket slipper.

FIG. 5 depicts an abbreviated insert 20B, which when assembled to solid cylindrical body 12B produces a substantially solid piston 10B. A small lubrication conduit 38B is optionally formed through the piston 10B. FIG. 5 further embodies an internal spherical socket 40B at the end of insert 20B, with corresponding external spherical ball 44B at the end of slipper 42B. Alternatively, FIG. 6 displays the equivalent substantially solid piston 10C with the spherical surfaces of the insert and slipper transposed whereby the end of insert 20C is external spherical ball 52C and internal spherical socket 54C is in the end of slipper 42C. A small lubrication conduit 38C is optionally formed through the piston 10C.

Therefore, it can be seen that the invention accomplishes its stated objectives.

What is claimed is:

1. A piston for a cylinder block of a hydrostatic power unit comprising:

an elongated cylindrical body having a center bore, an insert in the bore having a first end terminating in a spherical surface, the body being of a first material and the insert being of a second and different material, the body and the insert being joined together to form a cylindrical piston, the first and second materials being metallic, and the body being a solid cylinder.

2. The piston of claim 1 wherein the spherical surface forms an internal socket.

3. The piston of claim 1 wherein the spherical surface forms an external ball.

4. The piston of claim 1 wherein the piston has a conduit extending the length of the body and through the first end of the insert.

5. The piston of claim 1 wherein the body and the insert are joined by brazing.

6. The piston of claim 1 wherein the body and the insert are joined by brazing and heat treated in a single operation.

7. The piston of claim 1 wherein the body and the insert are joined by welding.

8. The piston of claim 1 wherein the first material has the properties of AISI 4140 and the second material has the properties of AISI 1010.

9. The piston of claim 1 wherein the piston is heat treated so as to harden the metallic material of the body and leave the metallic material of the insert malleable.

10. A piston for a cylinder block of a hydrostatic power unit comprising:

an elongated cylindrical body having opposite ends and a center bore;

an insert in the bore having a first end terminating in a spherical surface, a second end opposite the first end, and a shoulder between the first and second ends;

the body being a hollow cylindrical tube of a high carbon metallic material and the insert being of a low carbon metallic material; and the shoulder of the insert being sealingly joined to an end of the body.

11. The piston of claim 10 wherein the piston is heat treated thereby hardening the metallic material of the body and leaving the metallic material of the insert malleable.

12. The piston of claim 10 wherein the insert includes an elongated stem connecting the first and second ends, the stem having a diameter less than a diameter of the center bore so as to create an empty internal cavity therearound, the body and insert joined together to form a cylindrical piston having the first and second ends of the insert joined and sealed to the ends of the body thereby forming the internal closed cavity.

13. The piston of claim 10 wherein the spherical surface forms an internal socket.

14. The piston of claim 10 wherein the spherical surface forms an external ball.

15. The piston of claim 10 wherein the piston has a conduit extending the length of the body and through the first end of the insert.

16. The piston of claim 10 wherein the body and the insert are joined by brazing.

17. The piston of claim 10 wherein the body and the insert are joined by brazing and heat treated in a single operation.

18. The piston of claim 10 wherein the body and the insert are joined by welding.

19. The piston of claim 10 wherein the first material has the properties of AISI 4140 and the second material has the properties of AISI 1010.

* * * * *